Aug. 3, 1954    J. J. OSPLACK    2,685,234
BEVEL GEAR FINISHING MACHINE
Filed May 26, 1950    2 Sheets-Sheet 1
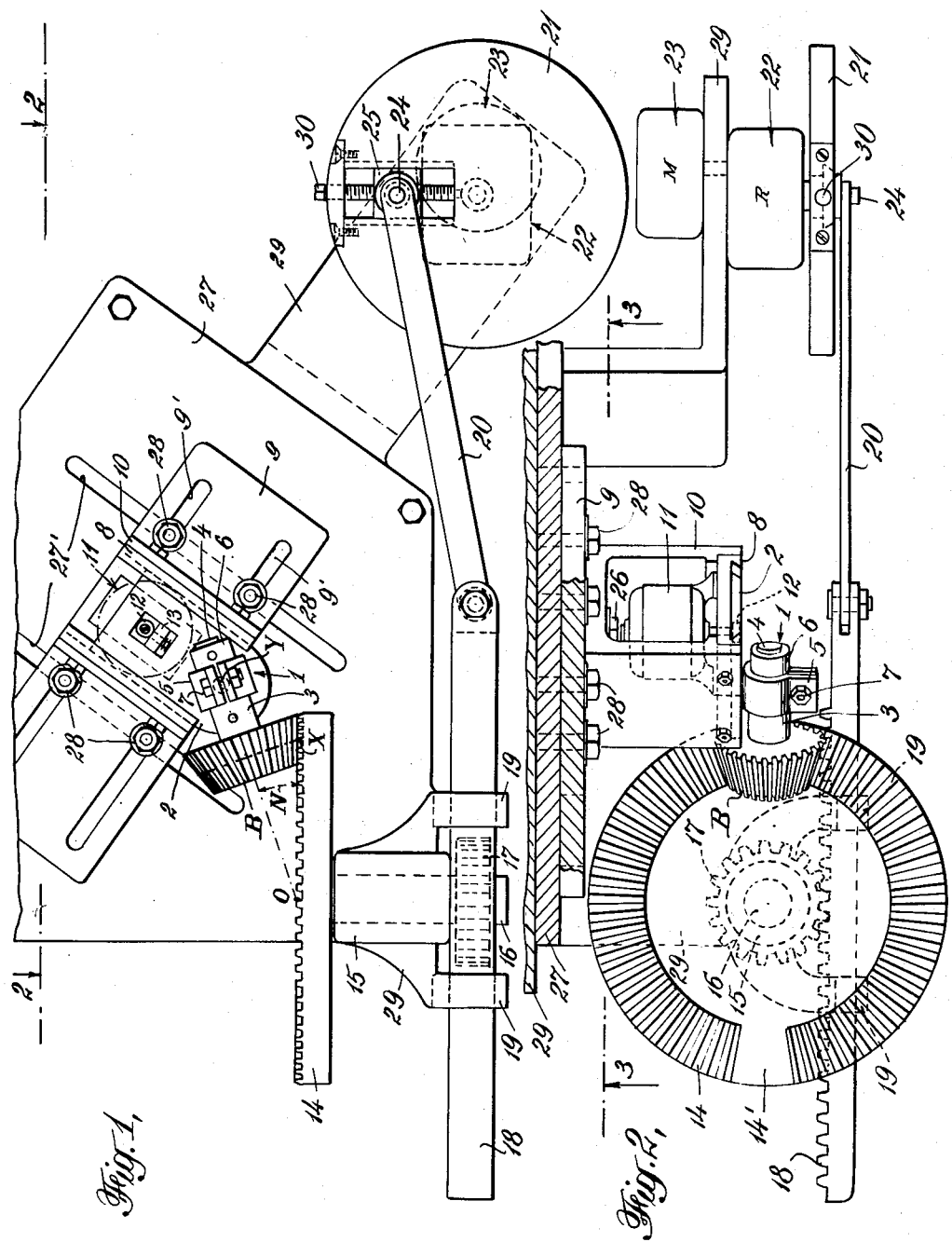
INVENTOR
BY *Joseph J. Osplack*
*Pennie, Edmonds, Morton & Barrows*
ATTORNEYS

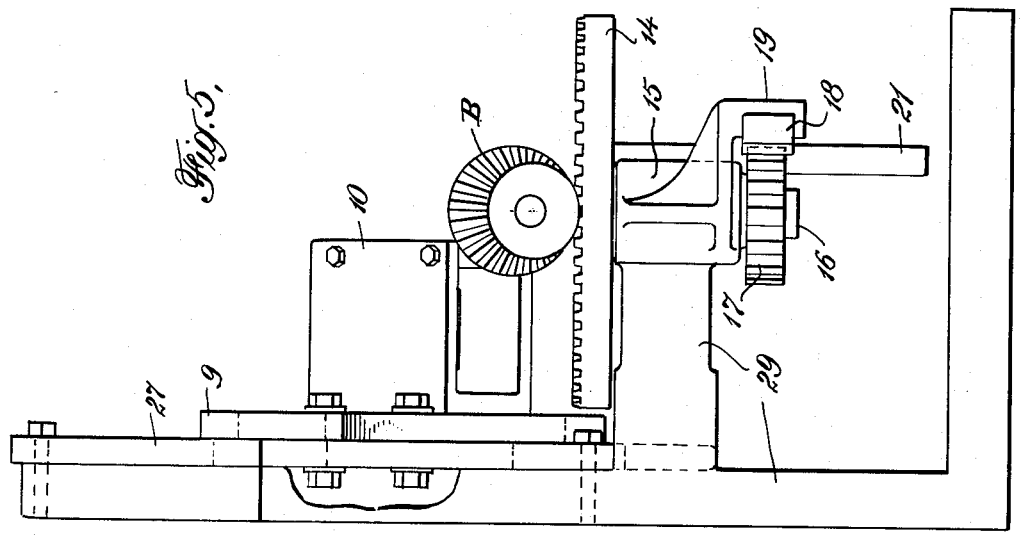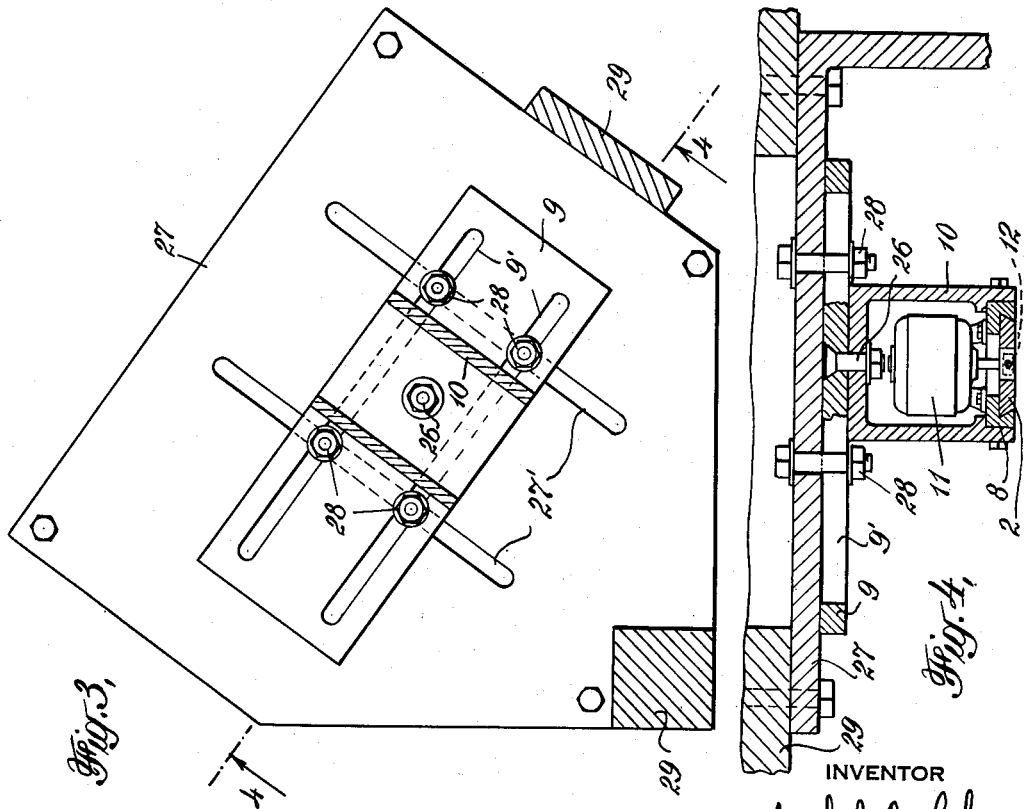

Patented Aug. 3, 1954

2,685,234

UNITED STATES PATENT OFFICE 2,685,234

BEVEL GEAR FINISHING MACHINE

Joseph J. Osplack, Detroit, Mich., assignor to Vinco Corporation, Detroit, Mich., a corporation of Michigan Application May 26, 1950, Serial No. 164,523

3 Claims. (Cl. 90—1.6)

This invention relates to a method and apparatus for finishing bevel gears. In particular, it relates to a method of removing tool marks and other imperfections from a roughed-out bevel gear and bringing that gear to finished dimensions by lapping, burnishing or shaving it with a crown gear cut to the form of the theoretical spherical rack of the finished bevel gear, and to apparatus for putting that method into practice.

A principal advantage of the method of my invention is that a crown-gear-shaped finishing tool can be accurately made to its exact theoretical shape by simple machining methods since the flanks of a tooth of such a gear are either plane or conical surfaces.

Ordinarily, the ratio of the pitch circumference of a conjugate counterpart crown gear, designed to mate with a bevel gear to be finished, to the circular pitch of the crown gear will not be integral. To meet this difficulty, either an oversized tooth may be left on the crown gear or a number of contiguous teeth may be omitted, leaving a wide relieved space, in the manner illustrated for a bevel gear checking master in the Beam and Stapleton application, Serial No. 674,152, filed June 3, 1946.

It will be apparent that, when such a crown gear tool is rolled with a mating bevel gear, there will be along the pitch circle only rolling contact between them and, hence, no finishing action will take place on the tooth flanks of the bevel gear at their pitch line. In order to overcome this difficulty and to provide for a complete finishing of the flanks of the bevel gear, I have provided for an additional motion of the bevel gear being rolled in contact with the crown gear tool. I find that this additional motion is preferably a rapid, reciprocatory motion of limited extent along a line making an angle with the pitch plane of the crown gear approximately one half that made by a line perpendicular to the axis of rotation of the bevel gear, though other directions of reciprocation may be used. What is needed is to impart a relative motion between the flanks of the bevel gear and the flanks of the crown gear tool other than a rolling motion at the pitch circle.

My invention is explained in detail below with reference to the accompanying drawings in which:

Fig. 1 is an elevation of an apparatus for carrying out the method of my invention;

Fig. 2 is a section taken on the line 2—2 of Fig. 1;

Fig. 3 is a section taken on the line 3—3 of Fig. 2;

Fig. 4 is a section taken on the line 4—4 of Fig. 3; and

Fig. 5 is an end elevation of the apparatus illustrated in Fig. 1 showing a supporting frame therefor.

Referring now to the drawings, a bevel gear to be finished B is journalled in a holder assembly 1 which is mounted on a vibrator plate 2. The holder assembly 1 comprises a spacing collar 3, a bearing and braking collar 5 and a retaining collar 6 about the shaft 4 of bevel gear B. The bearing and braking collar 5 is affixed to the vibrator plate 2 in such a way that the angular relation between the axis of shaft 4 and vibrator plate 2 may be adjusted by rotation of holder assembly 1 about a pivot at Y. Retaining collar 6 is locked about the outer end of shaft 4 to prevent axial movement thereof in bearing collar 5 in conjunction with spacing collar 3. Braking collar 5 is provided with a clamp bolt 7 by means of which an adjustable drag can be placed on the free rotation of shaft 4.

Vibrator plate 2 is mounted slidably in the direction of its longitudinal axis in a vibrator plate guide 8 which is affixed on adjustable U-shaped bracket 10. Bracket 10 is mounted on a movable plate 9 by means of a single clamp bolt 26 about which, when loosened, bracket 10 may be pivoted. Movable plate 9, provided with a pair of parallel slots 9', is mounted on fixed plate 27 provided with a pair of parallel slots 27' perpendicular to slots 9' by means of the four clamp bolts 28, each passing through one of the slots in each plate. Fixed plate 27 is carried by frame 29. By means of this arrangement the space relation of gear B to frame 29 is universally adjustable with the limits of travel afforded by slots 9' and 27'.

Vibrator motor 11 is carried by vibrator plate guide 8. An eccentric vibrator roller 12 is carried on the shaft of motor 11, held in engagement with one side of an aperture in vibrator plate 2 by a spring-loaded, impact slide 13 carried in that plate.

A crown gear tool 14 is journalled in frame 29 by means of bearing 15 and shaft 16. The teeth of crown gear tool 14 are shaped to coincide with the theoretical spherical rack of the bevel gear B, wide space 14' being provided to allow for the non-integral pitch circumference ratio of gear 14. Gear 17 is carried by the lower end of shaft 16 and engages reciprocating rack 18. Rack 18 is slidably mounted in guides 19 affixed to frame 29 and connected to crank pin disk 21 by a connecting rod 20. Disk 21 is mounted on and rotated by speed reduction drive 22 which is rotated by motor 23. Drive 22 and motor 23 are, in turn, mounted on frame 29.

The effect of the rotation of crank pin disk 21 is to impart a reciprocatory motion to rack 18 and thus to rotate crown gear tool 14 in alternate directions. The length of travel of reciprocating rack 18 and hence the amount of angular motion imparted to crown gear 14 is controlled by the location of adjustable crank pin 24 by which connecting rod 20 is affixed to crank pin disk 21. This adjustable crank pin 24 is carried by threaded block 25 which engages screw 30 journalled radially in disk 21. Rotation of screw 30 adjusts the effective "throw" of crank pin disk 21. This enables an appropriate amount of rotation to be imparted to crown gear tool 14 to finish equally every tooth flank of bevel gear B, no matter what its diameter.

Referring now especially to the geometrical relations illustrated in Fig. 1, it will be apparent that for a given bevel gear B, there is just one theoretical spherical rack which determines the dimensions of crown gear tool 14. Having constructed crown gear tool 14 to meet these theoretical considerations, the distance OX is determined by the distance from O, the pitch cone apex to X, a point on the pitch circle of bevel gear B. Moreover, the pitch cone angle of bevel gear B determines the angle N. It is necessary, therefore, to adjust the position of vibrator plate 2 on frame 29 so that pivot point Y will be located at the appropriate place determined by the distance OX and the angle N.

In order that the dimension of the finished gear be theoretically correct, the adjustment of pivot point Y is made with the eccentric vibrator roller 12 in its position nearest point X and with vibrator plate 2 held in firm contact with roller 12 by spring-loaded, impact slide 13. Moreover, the angular adjustment of vibrator plate guide 8 on frame 29 about pivot bolt 26 is preferably such that the angle between the longitudinal axis of guide 8 and the pitch plane of crown gear 14 is one-half the angle formed by that pitch plane and a perpendicular to the axis of shaft 4.

In operation, motor 23 and vibrator motor 11 are turned on and the alternate rotary motion of crown gear tool 14 carries bevel gear B through a complete rotation or more in each direction for each complete revolution of crank pin disk 21. At the same time, vibrator roller 12 engaged between spring-loaded, impact slide 13 and the vibrator plate 2 imparts a vibratory motion to bevel gear B in the direction of the longitudinal axis of vibrator plate guide 8.

Assuming that the finishing operation to be performed on bevel gear B is one of lapping, crown gear tool 14 will be made of cast iron and a cutting compound smeared on its surface. Under the action of vibrator motor 11, this cutting compound finishes the whole tooth surface of bevel gear B as it rolls with the teeth of crown gear tool 14. The finishing operation is complete as soon as the teeth of bevel gear B are dressed down to a point where spring-loaded, impact slide 13 is no longer depressed by vibrator roller 12 at the bottom of its travel. The rate of finishing can be regulated by adjustment of clamp screw 7 on brake collar 5.

If the finishing operation desired was a burnishing one, the crown gear tool 14 would be hardened and ground. Jeweler's rouge or other suitable burnishing compound would be employed in lieu of cutting compound.

If the finishing operation desired was that of shaving, the teeth of crown gear 14 would be serrated as the teeth of a file. The angle of these serrations would be that to obtain optimum cutting as a file from the relative motion between bevel gear B and crank gear tool 14.

While I have described the adjustment of the direction of the vibration to be imparted to bevel gear B in what I believe to be the optimum direction for the accurate finishing of bevel gears by the method of my invention, it will be apparent that by changing the angular relation between gear holder assembly 1 and vibrator plate 2 about pivot point Y, together with an appropriate adjustment of the space relation of vibrator plate guide 8 in relation to frame 29, a variety of other directions of vibration can be selected. For example, the angle of vibrator plate guide 8 can be adjusted parallel to the axis of holder assembly 1 so that the direction of vibration imparted to bevel gear B is along its axis of rotation or these parts may be adjusted so that the longitudinal axis of vibrator plate guide 8 is perpendicular to the axis of rotation of bevel gear B and the vibratory motion imparted to bevel gear B will therefore, be one substantially of rotation about the apex of its pitch cone at O. The essential criterion of adjustment for vibratory direction is that it affords other than rolling relative motion between crown gear tool 14 and the bevel gear B at the pitch circle.

While I have described my invention in terms of the detailed embodiment illustrated, which is especially suited for the finishing of straight bevel gears, it will be apparent to anyone skilled in the art that my method is equally applicable to bevel gears having other tooth forms. Thus I do not wish to be limited to the details of the machine selected for illustration, but rather by the scope of the appended claims.

I claim:
1. A bevel gear finishing machine comprising a frame, a tool in the shape of the theoretical spherical rack of the gear to be finished rotatably mounted on said frame, guide means carried by said frame, a plate slidably mounted on said means, journal means mounted on said plate for holding the gear to be finished rotatably in mesh with said tool, means for rotating said gear and said tool together, a motor mounted on said frame, an opening in said plate, a block slidably mounted in said opening, spring means urging said block in a direction away from said tool, and an eccentric driven by said motor engaged between said block and the end of said opening away from said tool.

2. A process of finishing bevel gears using a finishing tool in the form of the theoretical spherical rack of the gear to be finished in which said gear is given a rapid vibratory motion in a direction relative to said tool along the line bisecting the angle between the pitch plane of said tool and a line perpendicular to the axis of said gear.

3. The process of claim 2 in which the finishing tool is rotated in mesh with the gear to be finished alternately in opposite directions through arcs of less than 360°.

References Cited in the file of this patent
UNITED STATES PATENTS

| Number | Name | Date |
|---|---|---|
| 618,973 | Beale | Feb. 7, 1899 |
| 1,398,039 | Olson | Nov. 22, 1921 |
| 2,111,045 | Drummond | Mar. 15, 1938 |
| 2,112,996 | Perkins | Apr. 5, 1938 |
| 2,232,408 | Shaw | Feb. 18, 1941 |
| 2,291,537 | Drummond | July 28, 1942 |
| 2,309,530 | Perkins | Jan. 26, 1943 |
| 2,499,167 | Sanborn | Feb. 28, 1950 |

OTHER REFERENCES

"A Treatise on Gear Wheels," George B. Grant, 17th edition, 1929.